(12) United States Patent
Adrain et al.

(10) Patent No.: US 11,920,905 B2
(45) Date of Patent: Mar. 5, 2024

(54) ANTI-BALLISTIC LAMINATE MANUFACTURING METHOD AND PRODUCTS

(71) Applicants: John B. Adrain, Spokane, WA (US); Robert F. Bodi, Westlake, OH (US)

(72) Inventors: John B. Adrain, Spokane, WA (US); Robert F. Bodi, Westlake, OH (US)

(73) Assignee: Disruptive Resources, LLC, Sheridan, WY (US)

( * ) Notice: Subject to any disclaimer, the term of this patent is extended or adjusted under 35 U.S.C. 154(b) by 0 days.

(21) Appl. No.: 17/888,271

(22) Filed: Aug. 15, 2022

(65) Prior Publication Data

US 2023/0160667 A1 May 25, 2023

Related U.S. Application Data

(63) Continuation of application No. PCT/US2022/022860, filed on Mar. 31, 2022.

(60) Provisional application No. 63/169,783, filed on Apr. 1, 2021.

(51) Int. Cl.
*F41H 5/04* (2006.01)
(52) U.S. Cl.
CPC .................................. *F41H 5/0485* (2013.01)
(58) Field of Classification Search
CPC .................................................... F41H 5/0485
USPC ......................................................... 89/36.02
See application file for complete search history.

(56) References Cited

U.S. PATENT DOCUMENTS

| | | | |
|---|---|---|---|
| 2,149,481 A | 3/1939 | Bosch | |
| 2,366,514 A | 1/1945 | Gaylor | |
| 2,962,696 A | 11/1960 | Snyder | |
| 3,936,822 A | 2/1976 | Hirschberg | |
| 4,588,223 A | 5/1986 | Ledenyi | |
| 4,608,717 A | 9/1986 | Dunbavand | |
| 5,097,885 A | 3/1992 | Kitagawa | |
| 5,188,161 A | 2/1993 | Erber | |
| 5,370,035 A | 12/1994 | Madden, Jr. | |
| 5,756,922 A | 5/1998 | Fuller | |

(Continued)

FOREIGN PATENT DOCUMENTS

| | | | |
|---|---|---|---|
| RU | 2268453 C1 | 1/2006 | |
| WO | WO-2015073537 A1 * | 5/2015 | ............. B29C 70/06 |

OTHER PUBLICATIONS http://blog.modernmechanix.com/venetian-blinds-of-steel/; Modern Mechanix; Venetian Blinds of Steel (Oct. 1937).

(Continued)

*Primary Examiner* — Samir Abdosh
(74) *Attorney, Agent, or Firm* — Bodi Law LLC (57) ABSTRACT

Laminates and their process of manufacture, with the laminates made with anti-ballistic materials, such as woven and unwoven fabrics. The laminates are provided with different structures, materials, bondings, and other features, and example methods of manufacturing those laminates efficiently and in mass quantities. The method of production is a process of laminating individual flexible sheets including anti-ballistic material (which may be of woven or unwoven cloth or thin solid sheets or foils comprised of one or more light-weight anti-ballistic materials) into a flexible laminate for use to protect people or spaces from ballistic objects such as bullets and shrapnel from weapons and other moderate to high-kinetic energy objects.

32 Claims, 8 Drawing Sheets

(56) References Cited

U.S. PATENT DOCUMENTS

| | | |
|---|---|---|
| 5,802,783 A | 9/1998 | Bayha |
| 5,907,929 A | 6/1999 | Poma et al. |
| 5,917,775 A | 6/1999 | Salisbury |
| 5,939,658 A | 8/1999 | Muller |
| 6,044,889 A | 4/2000 | Liu |
| 6,125,905 A | 10/2000 | Woodside et al. |
| 6,176,050 B1 | 1/2001 | Gower |
| 6,212,840 B1 | 4/2001 | Davidovitz |
| 6,296,039 B1 | 10/2001 | Mullet |
| 6,298,766 B1 | 10/2001 | Mor |
| 6,325,085 B1 | 12/2001 | Gower |
| 6,338,377 B1 | 1/2002 | Domel |
| 6,412,391 B1 | 7/2002 | Stevens |
| 6,494,000 B1 | 12/2002 | Emek |
| 6,536,174 B2 | 3/2003 | Foster et al. |
| 6,604,322 B2 | 8/2003 | Horn et al. |
| 6,607,693 B1 | 8/2003 | Saito |
| 6,648,048 B2 | 11/2003 | Lai |
| 6,796,360 B2 | 9/2004 | Ferrie et al. |
| 6,862,970 B2 | 3/2005 | Aghajanian et al. |
| 7,036,279 B2 | 5/2006 | Crozzoli |
| 7,578,003 B2 | 8/2009 | Steeman et al. |
| 7,694,482 B2 | 4/2010 | Gazaway et al. |
| 7,980,166 B1 | 7/2011 | Fuqua |
| 8,082,970 B2 | 12/2011 | Gower |
| 8,322,268 B1 | 12/2012 | Booher, Sr. |
| 8,365,803 B2 | 2/2013 | Schoenheit et al. |
| 8,420,202 B2 | 4/2013 | Yang et al. |
| 9,134,097 B1 | 9/2015 | De Gaglia |
| 9,360,281 B1 | 6/2016 | De Gaglia |
| 11,125,537 B2 | 9/2021 | Rideb |
| 2001/0021443 A1 | 9/2001 | Bornemann |
| 2004/0025453 A1 | 2/2004 | Coddens |
| 2005/0144900 A1 | 7/2005 | Hallissy et al. |
| 2006/0032160 A1 | 2/2006 | Gazaway et al. |
| 2009/0071604 A1 | 3/2009 | Moeyersons |
| 2009/0241318 A1 | 10/2009 | Howard |
| 2009/0308543 A1 | 12/2009 | Kates |
| 2010/0043195 A1 | 2/2010 | Howard |
| 2010/0043292 A1 | 2/2010 | Wilkins et al. |
| 2010/0164743 A1 | 7/2010 | Domel et al. |
| 2011/0203451 A1 | 8/2011 | Turpin |
| 2011/0239850 A1 | 10/2011 | Raiser |
| 2012/0036988 A1 | 2/2012 | Daniels et al. |
| 2012/0325127 A1 | 12/2012 | Adrain |
| 2013/0019742 A1 | 1/2013 | Lecarpentier et al. |
| 2013/0062024 A1 | 3/2013 | Huang |
| 2013/0146236 A1 | 6/2013 | Chen |
| 2013/0222130 A1 | 8/2013 | Cooper et al. |
| 2014/0163751 A1 | 6/2014 | Davis et al. |
| 2014/0224108 A1 | 8/2014 | Sundberg et al. |
| 2014/0260937 A1 | 9/2014 | Whitaker |
| 2015/0000825 A1 | 1/2015 | Crook et al. |
| 2015/0059990 A1 | 3/2015 | Adrain |
| 2015/0225996 A1 | 8/2015 | Maksan |
| 2016/0143486 A1 | 5/2016 | Tsibulevskiy et al. |
| 2016/0176174 A1* | 6/2016 | Strauss .............. B32B 37/1018 156/286 |
| 2018/0229480 A1* | 8/2018 | Chung ...................... C09J 5/06 |
| 2020/0393217 A1 | 12/2020 | Adrain |

OTHER PUBLICATIONS

European Standard EN 1523: Windows, doors, shutters and blinds Bullet resistance—Test method. Feb. 1999.
European Standard EN 1522: Windows, doors, shutters and blinds Bullet resistance—Requirements and classification. Feb. 1999.
European Standard EN 12216:2002: Shutters, external blinds, internal blinds—Terminology, glossary and definitions. Dec. 1, 2002.
International Search Report PCT/US 2022/022860 (PCTUS2022022860_20220009331.pdf).
International Search Report Written Opinion PCT/US 2022/022860 (PCTUS2022022860_20220009818.pdf).

* cited by examiner

ANTI-BALLISTIC LAMINATE MANUFACTURING METHOD AND PRODUCTS

CROSS-REFERENCES TO RELATED APPLICATIONS

This application is a continuation of PCT application serial number PCT/US22/22860 filed on Mar. 31, 2022, which claims the benefit of U.S. provisional patent application No. 63/169,783 filed on Apr. 1, 2021, both incorporated herein by reference in their entirety.

BACKGROUND

Current anti-ballastic protection systems and barriers in residential and commercial applications such as armored doors, shutters, vests, and windows are usually made of ceramics, or metal or a material containing at least one metal plate, or plates of polymer and thus having a heavy weight or large volume or both. Some plastic systems exist that have lower weight, but that are very flimsy and weak, or stiff, and thus would provide no protection from projectiles or other forced entry into the dwelling or are easily pierced. For example, bullet proof glass is heavy and expensive.

A number of solutions using anti-ballistic laminates are being proposed for providing anti-ballistic protection. For example, U.S. Pat. No. 10,801,815, incorporated herein by reference, describes bullet proof blinds that use anti-ballistic laminates to form window blinds or other barriers that utilize light-weight anti-ballistic laminates. U.S. application Ser. No. 17/006,442, incorporated herein by reference, discloses anti-ballistic barriers such as doors that utilize light-weight anti-ballistic laminates to stop kinetic objects of substantial weight, such as people or vehicles, for example. U.S. Provisional App. No. 63/137,318 filed on Jan. 14, 2021 and incorporated by reference, discloses portable or mobile barriers that can be deployed when and where needed. Since such end-products are likely to be popular and sell well, an efficient and scalable method of manufacturing light-weight anti-ballistic laminates of substantial length and/or width that is easily utilized in mass manufacturing operations of the end-products such as those described above is needed.

SUMMARY

Generally, provided are a plurality of example laminates and their process of manufacture, with the laminates having different structures, materials, bondings, and other features, and example methods of manufacturing those laminates efficiently and in mass quantities. The laminates should have sufficient width to support the desired end products and should be provided in long lengths to support mass manufacturing of the end products. The method of production is a process of laminating individual flexible sheets of material (which may be of woven or unwoven cloth, thin sheets, or foils comprised of one or more light-weight anti-ballistic materials) into a laminated layer of flexible material for use to protect people or spaces from ballistic objects from weapons and other moderate to high-kinetic energy objects.

Provided are a plurality of example embodiments, including, but not limited to, a method of producing a continuous length of flexible ballistic resistant laminate comprising the steps of: feeding a continuous length of a first sheet of material including a ballistic resistant material into a bonding process; feeding a continuous length of a second sheet of material into the bonding process; feeding a continuous length of a third sheet of material into the bonding process; and using said bonding process to bond said first sheet of material, said second sheet of material, and said third sheet of material together to form said continuous length of flexible ballistic resistant laminate, such that said continuous length of flexible ballistic resistant laminate is sufficiently flexible to be rolled into a roll; and such that said flexible ballistic resistant laminate is configured to prevent a ballistic object including a bullet and/or explosive shrapnel from penetrating the flexible ballistic resistant laminate.

Also provided is a method of producing a continuous length of flexible ballistic resistant laminate comprising the steps of: feeding a continuous length of a first sheet of material including a first ballistic resistant material into a bonding process; feeding a continuous length of a second sheet of including said first ballistic resistant material and/or a second ballistic resistant material into the bonding process; feeding a continuous length of a third sheet including said first ballistic resistant material, and/or said second ballistic resistant material, and/or a third ballistic resistant material into the bonding process; and using said bonding process to bond said first sheet of material, said second sheet of material, and said third sheet of material together to form said continuous length of flexible ballistic resistant laminate. Optionally the step of adding an outer decorative layer to the continuous length of flexible ballistic resistant laminate. Such that said flexible ballistic resistant laminate is configured to prevent a ballistic object including a bullet and/or explosive shrapnel from penetrating the flexible ballistic resistant laminate.

Further provided is a continuous length of flexible ballistic resistant laminate produced by any of the above methods, such as one comprising: a first layer comprising a continuous length of a first sheet of material including a ballistic resistant material; a second layer comprising a continuous length of a second sheet of including said ballistic resistant material and/or a second ballistic resistant material; a third layer comprising a continuous length of a third sheet of including said ballistic resistant material, and/or a second ballistic resistant material, and/or a third ballistic material, such that said first layer, said second layer, and said third layer are bonded together to form said continuous length of flexible ballistic resistant laminate that is configured to be rolled onto a roll, and such that said flexible ballistic resistant laminate is configured to prevent a ballistic object including a bullet and/or explosive shrapnel from penetrating the flexible ballistic resistant laminate.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which.

DETAILED DESCRIPTION OF EXAMPLE EMBODIMENTS

This application describes innovations that permit the efficient mass production of a variety of different laminated flexible anti-ballistic materials for use in manufacturing the flexible anti-ballistic laminates used in various anti-ballistic products, such as the bullet proof systems disclosed in U.S. patent application Ser. No. 14/476,206 filed on Sep. 3, 2014, and U.S. patent application Ser. No. 15/050,639 filed on Feb. 23, 2016, and the bullet proof blinds disclosed in U.S. patent application Ser. No. 16/215,162, filed on Dec. 10, 2018, and the barrier systems disclosed in U.S. patent application Ser. No. 17/006,442 filed on Aug. 28, 2020, and the mobile protection systems disclosed in PCT/US22/12537 filed on Jan. 14, 2022, and all incorporated herein by reference.

This application also describes improvements to the processes and products described in U.S. patent application Ser. No. 14/985,897 (Pub. No. US20170191803A1) filed on Dec. 31, 2015 (hereinafter '897), and U.S. patent application Ser. No. 14/070,007 (Pub. No. US 2015/0122815 A1) Filed on Nov. 1, 2013 (hereinafter '007), all incorporated herein by reference.

Generally, an example manufacturing method is to create laminated material sheets in large quantities of substantial width (e.g., 3, 4, 5, 6, 7, 8, 8 10 or more feet or fractions thereof) and long lengths (dozens, scores, hundreds, or thousands of feet) comprised of individual sheet layers of flexible, anti-ballistic material that may contain woven or unwoven fibers (such as fibers comprised of lightweight anti-ballistic materials described herein), or otherwise arranged in individual thin sheets comprised of fibers of a light-weight, anti-ballistic material, such as Kevlar (or other aramid fibers that may include poly-para-phenylene terephthalamide), Lexan, Tensylon, Dyneema (ultra-high molecular weight polyethylene (UHMwPE)), Twaron, other polyethylene, boron treated cloth, boron screens, polycarbonate, fiberglass (e.g., ArmorCore), carbon structures such as graphene, DLC, nanotubes, and other lightweight fibrous anti-ballistic materials. Flexible sheets that can be used might also be comprised of thin sheets of solid (non-woven or even non-fibrous) materials (sufficiently thin to be flexible and rollable), or screens of material. Such sheets can be thin, like foil, paper, or cloth, or thicker, like thin or thick cardboards, or even as thick as various plywoods, for example. Woven sheets can be twill weave or plain weave woven fabrics, and/or can be woven using different fibers, such as an anti-ballistic fiber and a carbon fiber, for example. Unwoven sheets can be mats of fibers resulting in sheets of various thicknesses and/or densities.

Layers of certain materials may utilize spacers or other items to allow the laminate to properly be configured into a roll. For example, Dyneema layers may need to slide a bit in relation to other layers to allow for proper rolling of the laminate. Certain types of layers, such as of a slippery material, may act as a "spacer" to allow Dyneema or similar layers slip or slide a bit relative to each other to be more easily rolled.

These sheet materials, which may be manufactured in-house or obtained from the marketplace, are formed from woven or unwoven cloth-like sheets of fabric or other fiber-based sheets of material through processes known in the art into long rolls of substantial width (e.g., 2 ft, 3 ft, 4 ft, to over 8 ft wide, or 45", 53", 62" wide, for example) that can be fed into a laminating process (as described herein) to form laminates comprised of multiple layers of the material to form a wide, flexible, multi-layered anti-ballistic laminate that can be rolled or otherwise transported or fed for use in subsequent manufacturing into the desired end products. Silica powders or grains might be added to the sheets, whether woven or non-woven, to provide improved properties.

The sheets can be comprised from woven yarns, threads, or fibers to form knitted or weaved cloth-like material, or fibers can be arranged in a matted sheet of short or long fibers, like fiber-glass insulation or felt. Longer fibers and/or weaving may form more durable and less shedable sheets, but shorter fibers formed into a matt may be more economical to use.

Multi-layer graphene sheets can also be utilized for additional anti-ballistic properties. The graphene acts like a stretchy membrane, distributing the bullets energy over a large area, providing tensile strength, with stiff, strong, and elastic features provided simultaneously. Carbon nanotubes or other types of carbon fibers can be utilized as material to be added alone, or in combination with other materials described above, to add strength or other desirable properties. In some cases, the carbon may comprise half or more of the material in the sheet, or less than half. The carbon nanotubes (or other carbon fibers) are light, flexible, strong, and thermally-stable, and in a bullet proof (anti-ballistic) structure, millions of these nanotubes (or other fibers) come together to form carbon nanofibers which are woven together to create lightweight material sheets. The resulting carbon nanofibers are extremely efficient at absorbing energy, making them beneficial for bullet proof and bomb proof (shrapnel proof) materials and sheets and laminates. Other types of carbon fibers can similarly be used for strength or to provide other or additional beneficial properties. Sheets of metal foils might also be used to add strength or other properties, such as EMF protection or heat or EMF reflections.

These individual sheets might be comprised of woven yarns of material (threads, fibers, etc.), or individual fibers formed into a matt or other structure where the fibers hold together into a flat, flexible sheet by cross-interconnecting fibers or using adhesives or other bonding agents, or by pressing the fibers into a compressed sheet. Such sheets might be sprayed with, or dipped in or passed through, a liquid or powdered adhesive or plastic which, when set (suing heat or drying or other chemical process), may keep the fibers cohesive and connected together and not be loose and shedding. For example, the sheets might be sprayed using the same material comprising the fibers in liquid form, or dissolved in a carrier that evaporates, or multi-part portions that chemically react like an epoxy, or sprayed with a glue to bind the fibers together. The sheets might be pressed using a roller to compress the fibers, and they might be heated sufficiently such as by using heated rollers, arcs, hot air, to set the material and/or bond the fibers together.

Note that different layers of material can be chosen for combination to provide different properties. For example, mixing Kevlar and Dyneema together (e.g., in alternating layers or putting fire resistant layers as outer layers with Dyneema as inner layers) provides the advantage of both materials, including Dyneema's flexible bonding properties, and Kevlar's fire resistance. Coatings can be provided (such as by spraying or dipping) to improve fire resistance, such as coating with a fire retardant paint or coating, or using fire retardant adhesives (e.g., FLEXCON® V-59FR Non-Halogenated Flame-Retardant Adhesive), for example, to reduce the combustibility of materials like Dyneema. Layers of fire blocking material can be utilized in the laminate to improve fire resistance.

Adhesives can include epoxy, cyano-acrylate, polyamide, or modified phenolic adhesive or thermal curing agents. Bonding may be done in an atmospherically controlled environment. For example, Kevlar-to-Kevlar bonding may require only a relative humidity of 55%, whereas Kevlar-to-non-nylon materials may require a RH factor of 8.

The laminated layers are desired to be formed into a cohesive structure by bonding them together in a manner that does not easily separate back into individual sheets. This can use the processes disclosed in the '007 and '897 references, and might also including: gluing; stitching (including one or more of lockstitch, chain stitch, straight stitch, zigzag stitch, running stitch, back stitch, satin stitch); spot welding; arc welding; RF welding; flame lamination; riveting (or use of other fasteners); hook and loop fastening; quilting; taping; etc.

For example, a hot thin bar could be pressed into the laminate at regular intervals to weld thin strips of the material together at those regular intervals along its length, or even in a quilting pattern. Bonding based on mechanical, chemical, thermal, or hydrogen bonding can be used. Glues can be sprayed on or the material may be dipped or otherwise passed through a glue bath for subsequent curing by heat or chemical means.

Bonding could be accomplished using fasteners, such as powder coated staples or snaps or clamps, for example. Individual laminates could be provided with snaps or Velcro or other types of fasteners or bonding such as stitching or spot welding or gluing to allow additional layers of laminates to be stacked together to form further laminates of laminates. Plastic or metal rivets can be punched into the laminate. Combinations of these bonding approaches can be used.

Bonding approaches might be utilized that allow for the bond to break in situations of stress to allow the laminate to better absorb the energy of an impinging ballistic or other object. For example, threads used for stitching might be made breakable during certain high stress levels, or a Velcro-like connector may be designed to break away during high stress levels. By breaking such bonds may become a sacrifice to absorb kinetic energy, and/or allow for more relative motion between laminate layers to further absorb energy.

Alternatively, strong threads might be utilized for adding structural strength. Strips of strong materials or screens may be used to add additional structural strength and other desirable qualities.

Generally, the desired number of layers, from two to half a dozen to a dozen to more, to 16 layers of ballistic sheets, or more, are rolled out and stacked and fixed (bonded) together using the desired method such as those described above or below. Or a few sheets might be formed into a laminate, and then those laminates used to form further laminates downstream to increase the thickness and provide desired properties. For example, two or three-layer laminates can be formed that can then be combined to form 2, 6, 8, 10, or more layer laminates using one or more downstream laminating stations. Any number of laminating stations can be utilized, as desired, for increasing thickness, and by repeating stations, economies of scale are provided by repeating similar stations serially.

Laminates of various numbers and types of layers can be provided as alternatives for use various types of products. For example, fewer layers may be used in a rollable blind where flexibility and rollability is important whereas more layers might be used in a fence or permanent structure where more protection is desired and repeated rolling is not necessary.

Furthermore, the initial laminates may use one method of combining the layers together while the downstream lamination methods use a different method or different layers. For example, the initial laminate might be bonded using a glue (or stitching), with the subsequent laminations bonding the glued laminate using stitching (or gluing), for example. Some stations may bond woven layers, while other stations bond unwoven layers. Further, some stations might add metallic screens, structural layers, decorative layers, or adhesive layers, for example (especially such as external decorative layers). By placing these stations serially, any desired composition of laminates can be provided, as desired. Hence, a laminate having 3 or more layers of anti-ballistic sheets of fabric (or other flexible sheets) can be provided with outer layers of decorative or structural or fire resistive layers, for example. Or structural and/or fire resistive layers may be used alternately in the laminate.

Furthermore, it may be desired that different sheets of different material are used for different locations in the laminate, or at the same locations. For example, the inner layers of the laminate might be comprised of one or more sheets of mats of loose fibers, whereas outer layers are comprised of sheets of woven material. In this manner, the outer sheets, which will naturally be less likely to shed fibers, can contain the more likely to shed fibers of the inner layers. In this manner, cost savings may be obtained by using fewer layers of woven material and more layers of matted material while achieving the benefits both. In such an approach, the method of bonding the laminates may depend on the type of sheets used in the laminates. For example, it may be more effective to glue matted unwoven sheets together, while woven sheets are stitched or spot welded, for example.

Layers of fire retardant materials can also be interspersed between layers of anti-ballistic materials and/or layers of strengthening materials to achieve the desired properties. It may be beneficial to put combustible layers in a center and cover them with fire resistant layers as outer layers. Or such layers can be alternated. Furthermore, one or more layers, or the entire laminate, might be saturated with or provided with a layer of an anti-ballistic or fireproof gel for further anti-ballistic properties, fire retardant properties, adhesive properties, or any combination of these properties or other properties.

Such approaches can lead to a number of embodiments for creating different types of structures and manufacturing approaches. For example, a three layer laminate might be comprised of one or more inner, matted sheet(s) formed at one laminating station, and one or more outer, woven sheet(s), all stitched or glued together at a subsequent processing station. Or all three layers may be of the same material processed at one station, or two at one station and the third at another station. In this way, processing stations can be placed serially to achieve many different desired layers using various different bonding methods.

Figure 1:
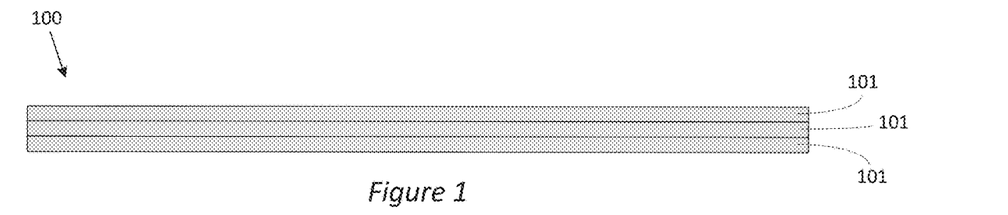
FIGS. 1-5 are schematic diagrams of side cut views of various example embodiments of laminates that can be manufactured according to one or more of the disclosed methods.
Figure 6:
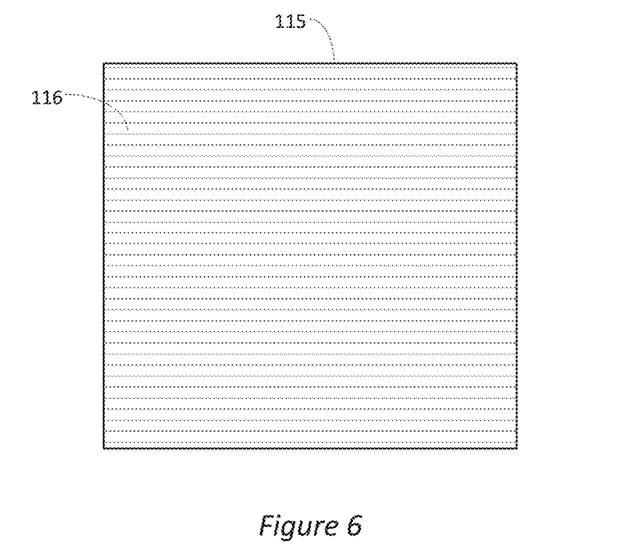
FIG. 6 is a schematic diagram of a top view of a laminate that is bonded using stitching.

For example, FIG. 1 shows an example laminate 100 having three layers 101 of the same material bonded together using any of the methods disclosed herein. FIG. 6 shows a view of a laminate 115, such as shown in FIG. 1 or another embodiment, that is bonded using stitching 116 provided horizontally across the laminate in a regular pattern. The distance between stitches can vary according to need, but closer stitching can help prevent fraying and other problems when cutting the laminate. Stitching in a quilt pattern can improve such features as well by adding vertical stitching as well.

The stitching process itself can be used to provide desired properties. For example, the stitching might provide structural strength, or have energy absorbing properties to aid in the integrity and anti-ballistic properties of the resulting laminate. Various different stitches could be used, such as chain stitching that is easier to implement and allows material to stretch and move easier, or the more secure lock stitch that is more difficult to utilize (requiring a bobbin), but is less likely to unravel and provides additional benefits. Threads for stitching might be chosen for structural strength, such as by using polymer or aramid threads, or they might be chosen to have break-away capability for increasing energy absorption capability. Metallic or cotton or nylon or other types of threads can also be used.

Woven layers might be bonded using glue, spread on entire sheets or as lines or other partial coverage. The glue might be sprayed or laid on, and then cured using a heat treating or chemical process, or by spraying with water (prior to, or subsequent to, applying the glue), or the glue may be self-drying (such as by exposure to oxygen or evaporation of a substrate). A powdered glue or polymer might be used that melts when heated to flow into the layers and form a permanent bond.

Alternatively, double or triple layer matted, unwoven sheets might form one laminate all glued, pressed, sewed, or spot welded together, that is later processed to add an outer layer on one or both sides of woven sheets that are stitch bonded or glued to the adjacent laminate, leading to a 2, 3, 4, 5 or more layer laminates, for example. Sixteen layers is a desirable laminate amount for some purposes. And by using more than one method of bonding, the benefits of those different methods can be combined, improving the final result.

Furthermore, layers might be provided to add additional desired properties. For example, layers, strips, threads, etc. that add strength could be provided. Or fireproof layers. Or insulating layers. Or decorative layers (especially as one or both outer layers). Or bonding layers. Or anti-ballistic layers. Sheets having different properties can be combined to offer unique features. For example, mixing and matching sheets using different types of anti-ballistic materials can be chosen to offer strength, fireproofing, flexibility, and other desired properties.

Outer layers that are slippery, such as might be coated with polymer coatings like Teflon or other slippery surfaces, may be used to provide desired features, such as ease of deformation or turning of bullets, and slippery motions. Reflective outer layers (such as a polished metallic foil) may be useful for heat protection. Rubber or other resilient materials may be used for outer layers or inner layers to add spring or return properties to the material. Layers may be used that hold their shape once formed into that shape, such as a metallic layer, for example.

Layers that react chemically or physically to a ballistic impact can be utilized to transform kinetic energy into feeding a chemical reaction, or layers might self-destruct to absorb energy. Materials that momentarily melt or deform can be used to absorb kinetic energy.

Metal screens might be used to add stiffness and further anti-ballistic properties, where flexibility is less important. Or metal screens that are sufficient thin can still allow for flexibility. Metals such as steel alloys (e.g., stainless steel, carbon steel, etc.), copper, bronze or brass, aluminum, or other types of metal or alloys thereof can be utilized. Metal threads might be used for strength. Metal powders might be used to achieve desired properties.

Figure 5:
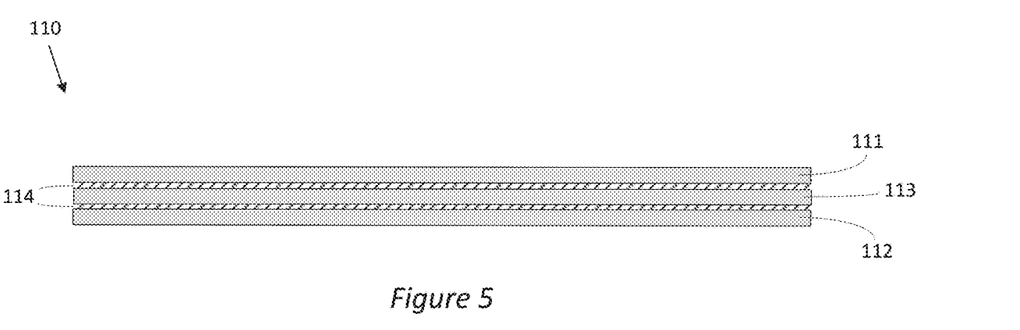

For example, FIG. 5 shows a laminate 110 having anti-ballistic layers 111, 112, and 113 (which may be different types of layers—e.g., woven and unwoven, or the same types of layers but of different thicknesses, or the same layers, any as described herein), with metallic screens 114 provided between the layers for strength and further anti-ballistic properties. Note that if the screens 114 are made sufficiently thin, the laminate 110 will be flexible, but the screen might be made sufficiently thick to help the laminate hold its shape when bent, curved, or folded. Such a laminate can be fashioned into various configurations of different geometric shapes to make complex objects or to fit into complex locations, such as corners, etc. Thin foils or small gauge screens could be used to add EMI protection.

Or some layers might be comprised of a fibrous or solid sheet of glue or resin material that melts and bonds adjacent layers when heated and melted. Such a material may flow into the adjacent layers, creating a strong bond without the use of any liquid adhesives. Hence, the laminating and bonding process might include placing an inner layer of glue sheet (solid or fibrous) between two outer layers of anti-ballistic sheets, then running the stack through heated rollers or an oven to melt the inner layer to bond the two outer layers together. Or glue might be sprayed or spread on various laminate layers with the layers then stacked on top of each other.

Figure 7:
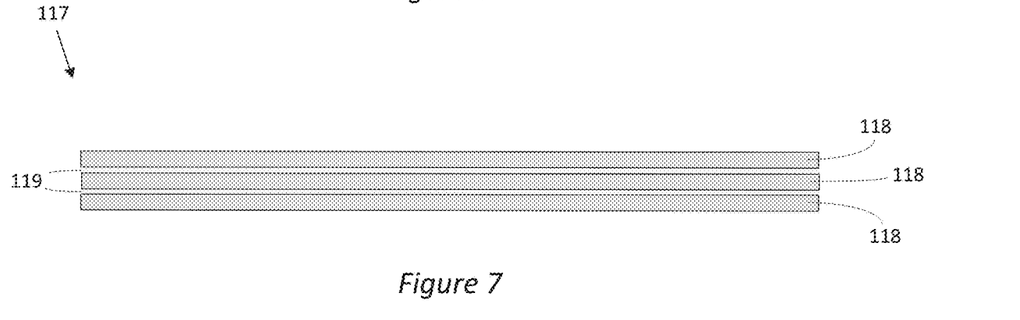
FIG. 7 shows a side cut view of a laminate that is bonded using glue.

FIG. 7 shows an example laminate 117 having anti-ballistic layers 118 bonded using a glue or resin layer or gel layer 119 provided between them, which might also provide useful properties, such as fireproofing (using a fireproof adhesive), structural strength, or even additional anti-ballistic properties. Use of a glue can be an air-dry glue, or a two-part glue such as an epoxy, or a heat activated glue, or a resin, for example. A gel, which may remain a gel in the finished product or may be solidified, may provide additional anti-ballistic properties, fire resistance, or other desirable features. These layers 119 might be laid on (as a sheet of material or strips of material) or sprayed on or spread on during the bonding process and could be heat activated or chemical activated (such as by exposure to air/oxygen).

Figure 3:
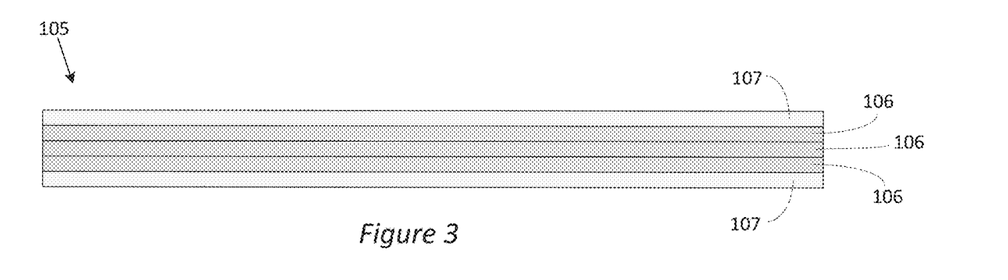

Furthermore, the outer layers might be made decorative or paintable, or in some other manner that leads to flexibility in the esthetics of the end product. In some cases, the final, outer layers may be solely for decorative purposes, with no anti-ballistic properties. For example, FIG. 3 shows an example laminate having inner layer(s) 106 of anti-ballistic material bonded together, with outer layers 107 bonded to the inner bonded layers which may be decorative for aesthetic reasons.

Another approach is to use one thick layer of matted, unwoven fibrous sheets placed between two outer layers of thinner sheets of woven fabric or other solid material. Then, if the layers are quilted or stitched or glued together, the mat fibers will mostly be locked into place between the woven or solid layers, allowing flexibility and material volume at lower cost. Note that these laminates can be processed between rollers to compress them and reduce the overall volume (thickness) of the laminate. Alternatively, higher volume might be desired in some applications, in which case the mat sheets are kept thick and airy and not tightly wound on finishing rolls. For example, thick, airy sheets can be used for forming blankets that insulate as well as cover and protect the contents from ballistic attack. Protective products providing insulation can be used to create tents, clothing, rugs, drapery, or other protective products in a wide variety of forms.

Figure 2:
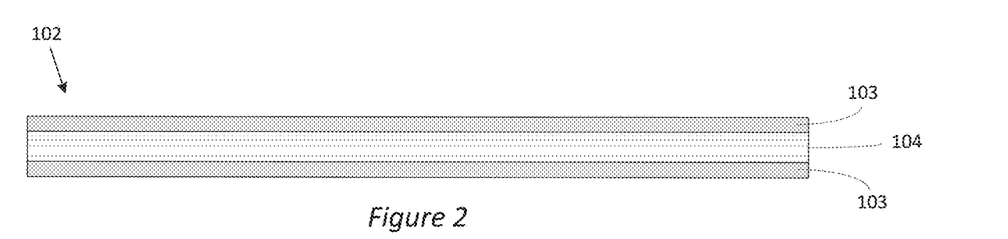
Figure 4:
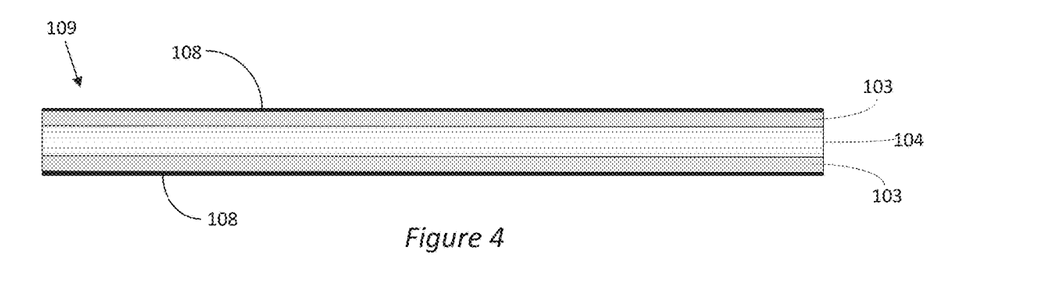

For example, FIG. 2 shows an example laminate 102 having a thicker, inner layer 104 comprised of, for example, matted fibers surrounded by two outer layers 103 of woven material, or a laminated material comprising a plurality of layers of woven or unwoven material. Alternatively, thicker woven layers might be adjacent to inner woven layers between them (of the same, or different, materials). Or FIG. 2 might show an inner laminated material with opposing structural or decorative layers 103 on one or both outer sides. Similarly, FIG. 4 shows the laminate 102 of FIG. 2 adding two outer layers 108 for structural or decorative purposes. Hence, three different types of layers could be utilized, such as an unwoven mat 104, woven layers 103, and decorative or structural layers 108. When desired, only one outer layers 108 might be used, or one layer might be decorative and the other structural. Or layer 104 may be comprised of a laminate of a plurality of woven or unwoven layers or a combination thereof.

The laminate might be made stretchable by using an approach like above, where the inner layers are more fibrous and looser formed, with the outer layers being stretchable, such as a thin rubber material that may be a rubber with embedded anti-ballistic fibers. Chain stitching can aid in stretchability. Alternatively such a laminate might be stitched together using a rubber or other stretchable thread acting like a bungee cord.

Note that these various laminate features described above can be mixed and matched to provide desired features. Any of the types of starting sheets of material, whether comprised of matted, unwoven fibers, woven yarns, felts, screens, glues or other bonding agents, decorative layers, structural layers, etc. can be mixed and matched to provide the desired features for a given application. Bonding methods can be combined in order to provide additional structural advantages, where desired.

The laminate examples discussed above, along with other variations, can be efficiently manufactured in volume in order to meet market demands. In particular, the provision of strong, anti-ballistic properties for adding to various products and structures is desirable.

Figure 8:
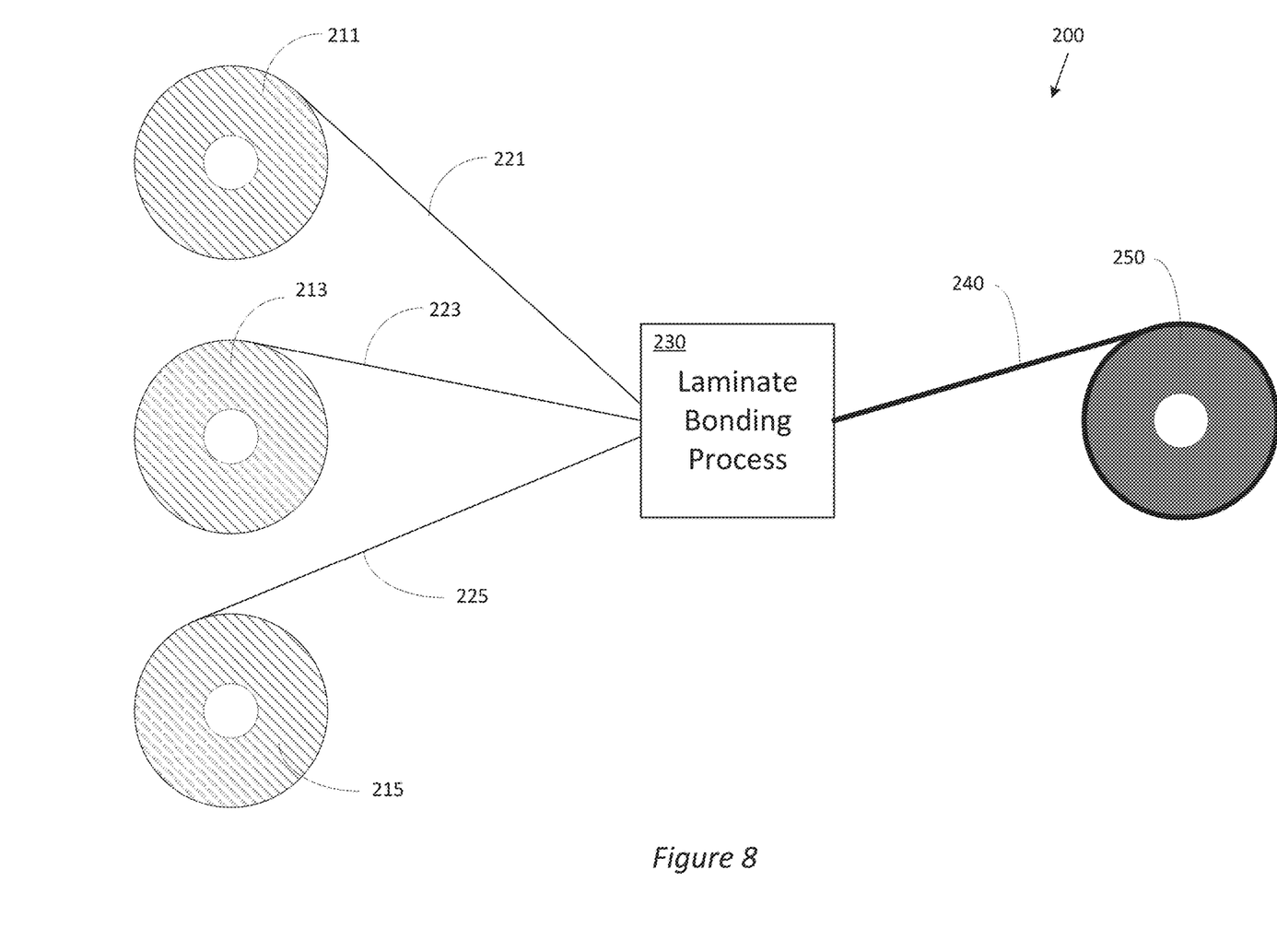
FIGS. 8-10 are schematic diagrams of various example manufacturing processes for producing laminates such as those shown in FIGS. 1-6, among others.

FIG. 8 shows an example manufacturing process 200 that can be used with many of the disclosed embodiments. Multiple rolls of material (e.g., continuous sheets or laminates), 211, 213, 215 (three are shown in the example but different numbers of rolls can be utilized) are provided each having material 221, 223, 225, respectively, rolled thereon. These materials 221, 223, 225, may all be comprised of the same material, or of different materials, as desired and described herein. For example, woven or unwoven (or both) fabrics of anti-ballistic material might be used, or one may be a bonding agent such as a glue or resin mat, for example.

The materials 221, 223, 225 are continuously fed into a Laminate Bonding Process 230 that bonds the materials 221, 223, 225, into layers of the resulting laminate 240 that are bonded together, preventing separation. The bonding process could include heating, spot welding, gluing, stitching, the processes disclosed in the '007 or '897 references, or any other process described herein or known in the art to bond laminates or other sheets of materials (such as woven and unwove materials, foils, thin films, etc.), or any combination thereof. The bonded laminate 240 can then be wound onto a roll 250 for transport to another location, for use in manufacturing products, or for further processing at another location, or the laminate 240 could be fed directly into another process (without rolling) for further processing and/or making into finished components or finished goods in a continuous process.

Figure 9:
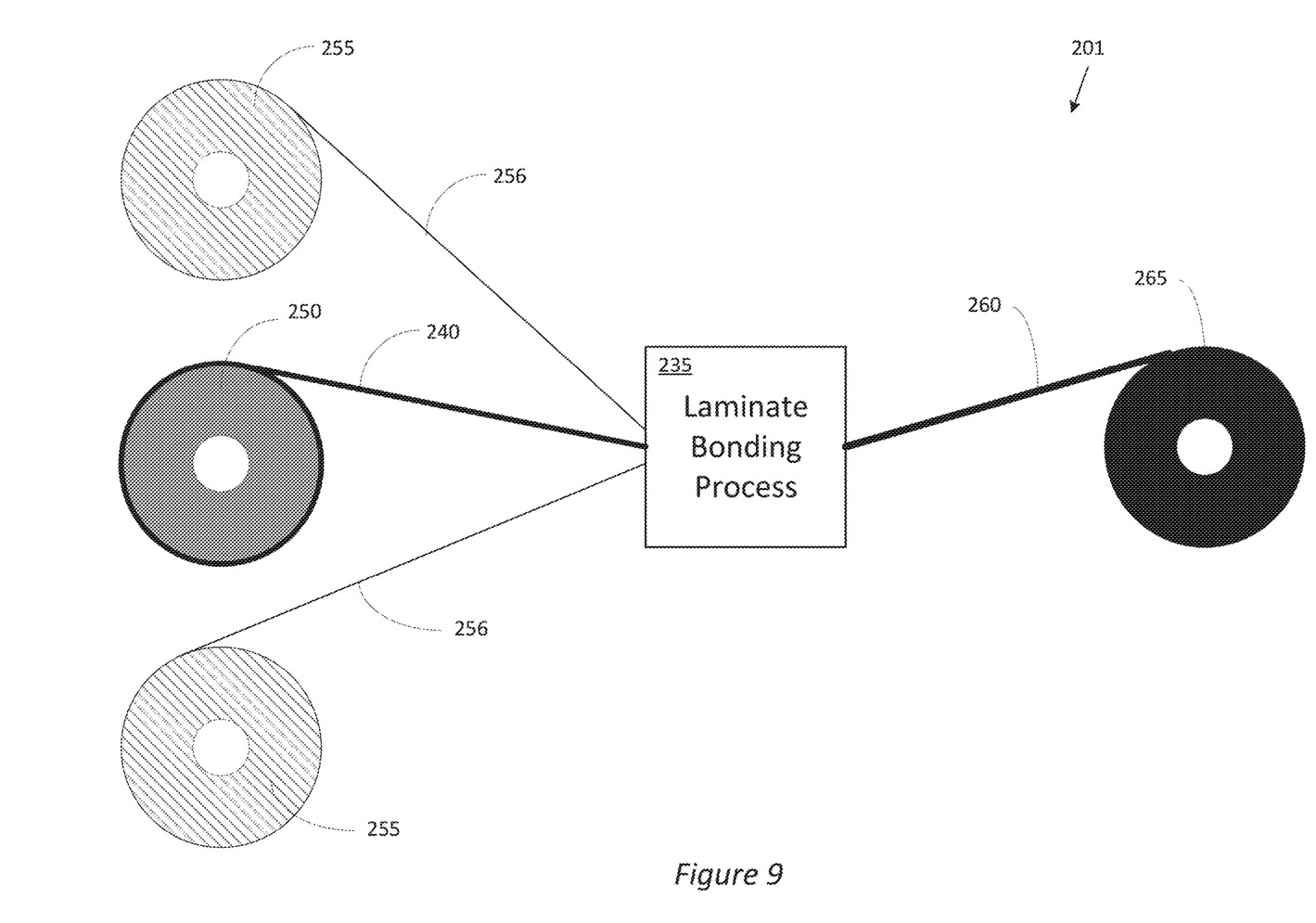

FIG. 9 shows an example further downstream process 201 that uses the laminate 240, along with additional layer materials 256 (e.g., a continuous sheet) that are continuous fed to produce a further laminate 260. For example, the layer materials 256 may be decorative material that is to be bonded with the laminate 240 for decorative purposes, or it might be structural material, or additional sheets of material having desired properties such as anti-ballistic properties. For example, the laminate 240 might be comprised of a matted, unwoven material comprised of anti-ballistic fibers that are glued together, whereas material 256 is of a woven material that will encapsulate the matted laminate 240 using for example, glue or stitching to bond them together. Note that the roll 250 might be avoided if the laminate 240 is fed directly into the station 235.

Alternatively, the laminate 240 might be replaced with a single layer of matted, unwoven fibers formed into a sheet that is then encapsulated by woven, low shed material 256, as described hereinabove. Or material 256 may be a prior formed laminate.

These layers 240, 256 are then bonded together into laminate 260 by the Laminate Bonding Process 235, which might include any of the bonding methods discussed herein, such as using stitching, adhesive, welding, etc. Laminate 260 can then be wound onto a roll 265, or provided for further processing such as described in FIG. 11, which shows a finish process 300 with laminate 260 being processed by a slitting/cutting process 320 into individual sheets or panels 310. Other types of processing can also be provided, as desired, including processing into finished goods such as anti-ballistic doors or window blinds, for example.

By utilizing the above disclosed processes in series, laminates of any desired number layers having any desired combination of composition can be manufactured. For example, a 16 layer laminate can be made using four stations creating four layer laminates all feeding into an additional station to create the 16 layer laminate. The 4 layer stations may use one type of bonding (e.g., glue) and the 16 layer station a different type of bonding (e.g., stitching), for example. If desired, the 16 layer laminate may then be fed into an additional station for adding one or two decorative outer layer(s), for example. Of course, numbers other than 4 or 16 can be utilized, as desired, to create any numbers of layers at any stage of the manufacturing process.

Figure 10:
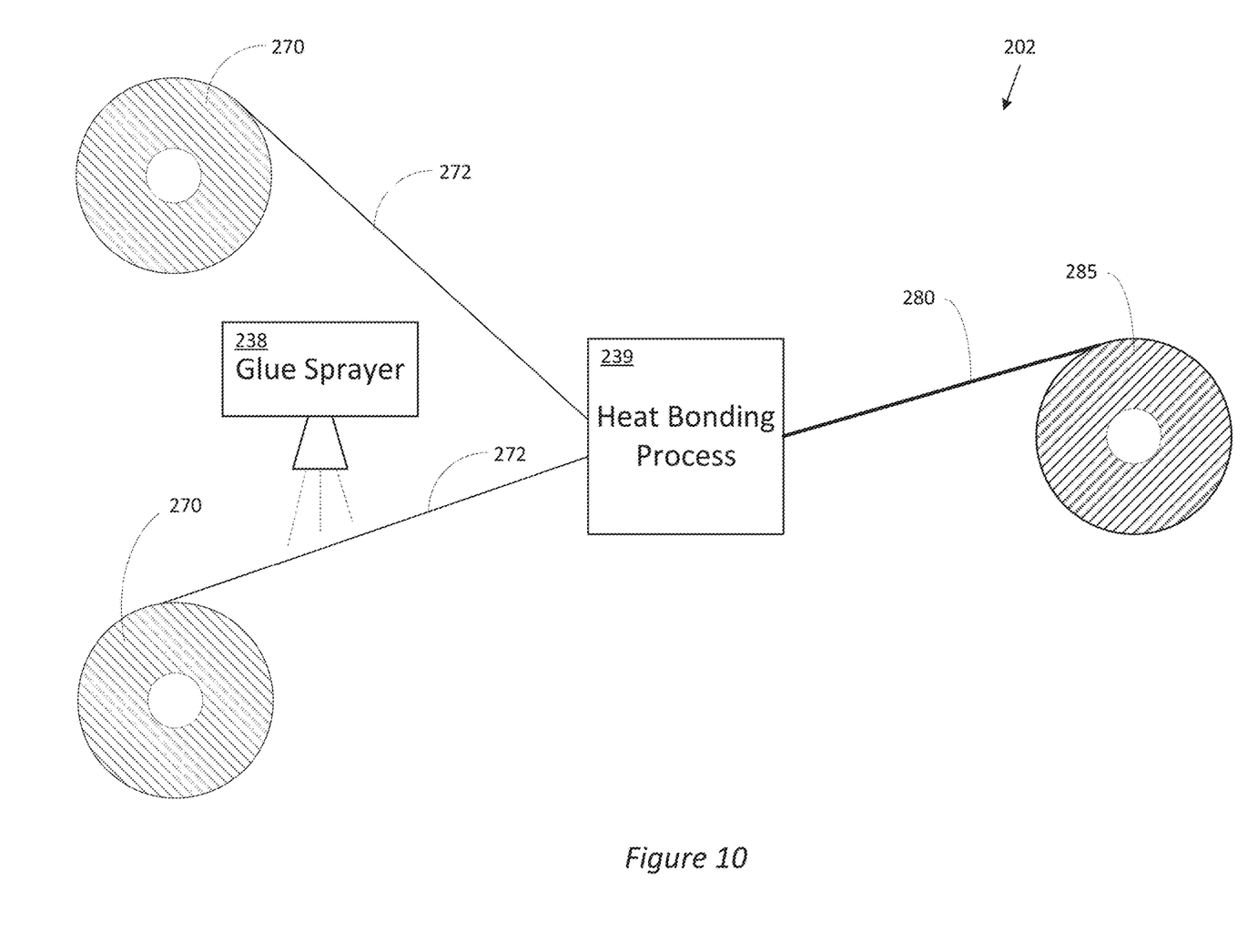

FIG. 10 shows an additional method 202 of manufacturing a desired laminate 280 by continuously feeding two or more continuous sheets of material 272 from rolls 270 past a glue sprayer 238 that sprays a glue (or some other bonding agent) onto some of the laminate layers 272 such that each adjacent layer has at least one surface covered in glue. The sheets 272 are then put through a Heat (or chemical or other) Bonding Process 239 that cures the adhesive, such as by heating, or blowing drying air, or spraying a chemical, or some other process to cure the adhesive, leading to a bonded laminate 280 that can be rolled onto roll 285, if desired.

Figure 13:
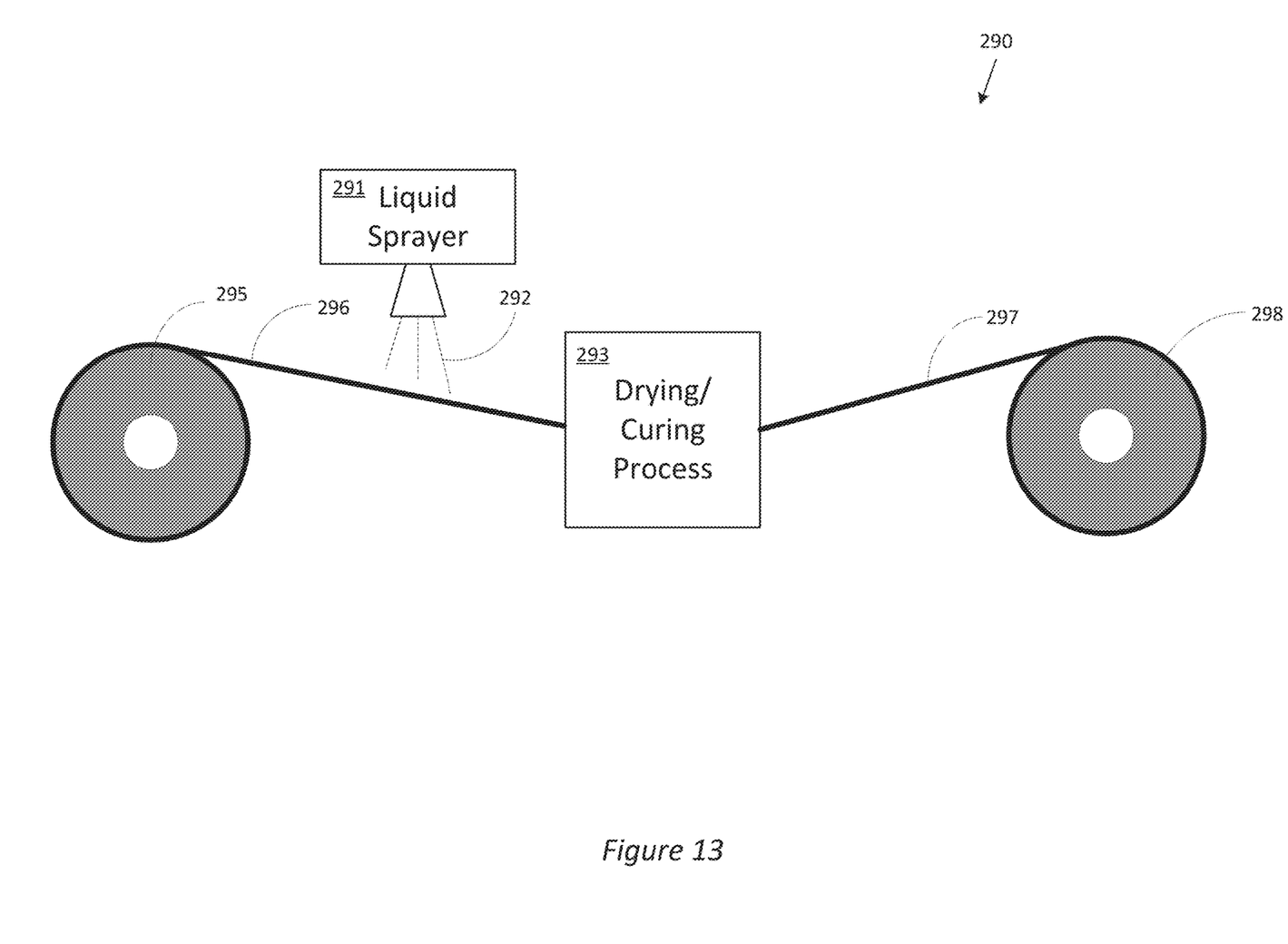
FIG. 13 is a schematic diagram of an example surface treatment process for adding an external decorative layer to a laminate.

As an alternative, the sprayer 238 may spray a fire resistant substance, or it might be sprayed on outer surfaces of the laminate sheets rather than on inner surfaces to provide structural strength, fire-resistant, decorative, reflective (light or heat), and/or other desirable features. For example, FIG. 13 shows a process 290 for adding a decorative outer layer using a sprayer 291 to spray a liquid or gel substance 292, such as a paint, sealant, glitter, or other substance onto an outer surface of a laminate 296 being fed from feed roll 295 into a drying or curing process 293 to cure or dry the substance 292 for outputting a laminate 297 having the outer surface layer thereon being rolled onto roll 298. Such a process could be used to provide an outer layer for a decorative outer surface on the laminate, or to seal the laminate surface, or provide a textured surface, etc.

Additional processes can be utilized. For example, the process of FIG. 8 might use two outer layers of materials (221, 225) with an inner layer of bonding material (223) that is then heat processed to form a dual layer laminated with an inner layer of adhesive bonding the outer layers together. Any of the above bonding processes can be mixed or matched to obtain the desired features of the final laminate, and laminated layers can be further laminated with other or similar layers as desired, to obtain a final laminate of any desired thickness and any desired number of layers.

Figure 12:
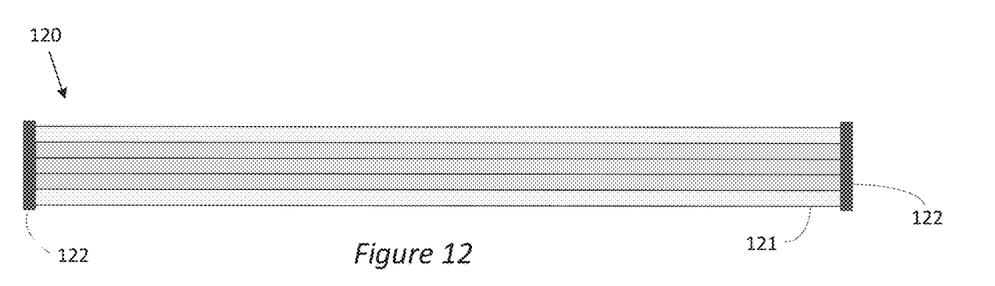
FIG. 12 is a schematic diagram of a side cut view of any of the laminates disclosed herein with added edge caps.

FIG. 12 shows a laminate 120 using any of the above laminates disclosed above, but having an additional manufacturing step of providing edge caps 122 to edges of the laminate 121. This can be particularly useful when the laminate 121 is comprised of sheets of a woven or unwoven fabric that may display frayed edges (such as due to fiber ends due to cutting or the result of the manufacturing process). These edge caps 122 may be comprised of a glue layer provided on the edges, solidified plastic provided on the edges, a sprayed on material, or may be created by melting and solidifying an edge of the original laminate.

Alternatively, the ends of the edge may have one or more outer sheets (such as by providing a wider sheet to have overlap) folded over and bonded to the opposite outer sheet (such as by gluing, stitching, spot welding, etc.) to seal the edge. The frayed edge of the folded sheet, if any, can be glued or otherwise fixed by some bonding process to the surface of the other outer sheet to seal the fray.

Hence, adding an additional step of providing such edge caps as described above to seal the edges would mitigate the problems that may occur with frayed edges, such as shedding or additional fraying.

One alternative process is running the laminate layers through a liquid bath to provide desired properties and to further prepare the layers, such as impregnating the individual or laminated layers for desirable properties. For example, boron baths can be used on any absorbent material, adhesive baths, or other liquid treatments to add desirable properties such as additional anti-ballistic properties, for example.

Note that the feeding process of continuously feeding sheets for processing could be varied to achieve desired properties. For example, feeding from the vertical or at an angle may allow excess adhesive or coatings to drip off. Yarns or threads could be coated or soaked to pre-treat them to obtain desired features.

Figure 11:
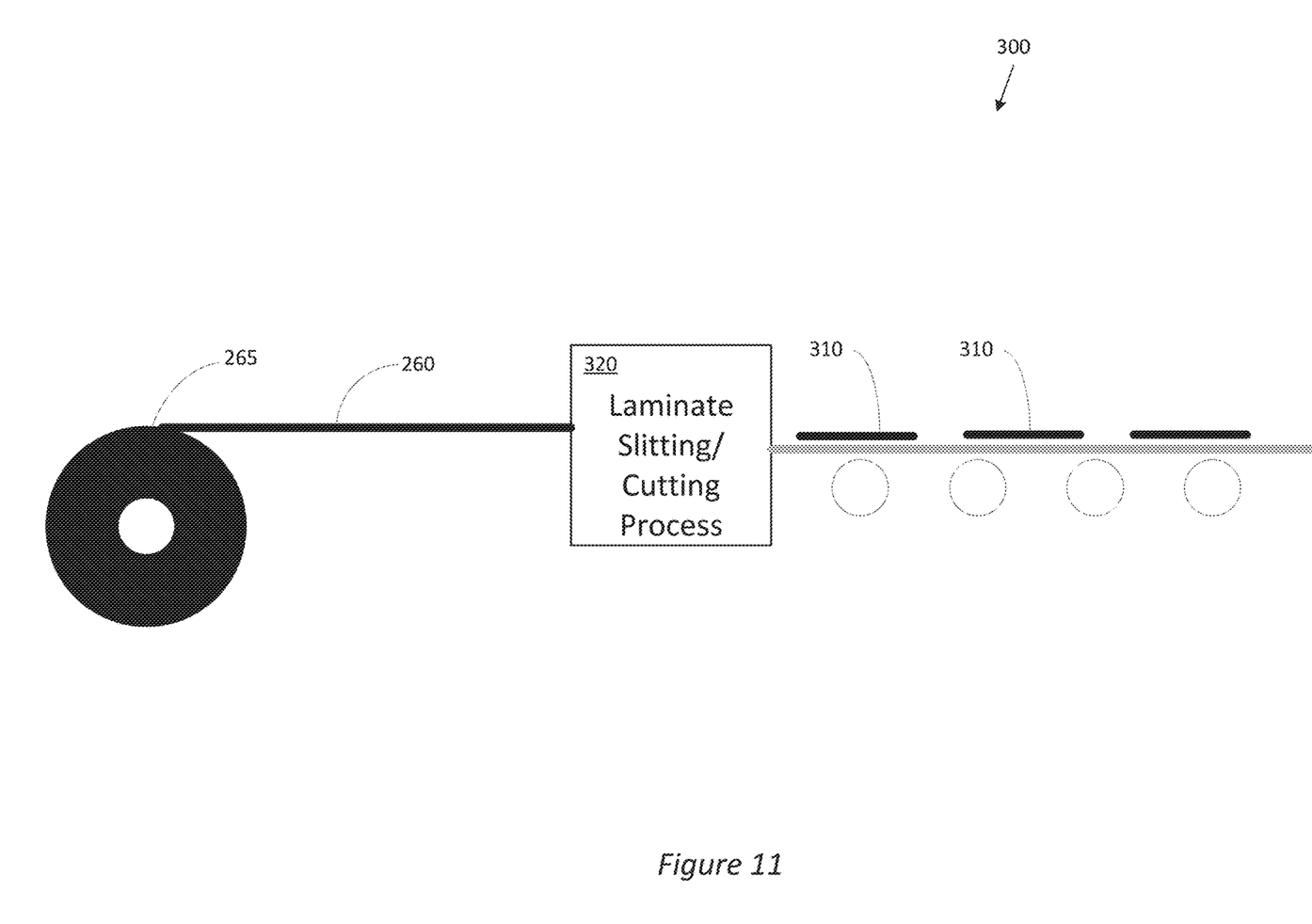
FIG. 11 is a schematic diagram of a cutting/slitting process for further processing a laminate produced as provided herein.

FIG. 11 shows a slitting or cutting process that can be used to cut the laminate into lengths (and/or widths) of the desired size. The laminate 260 (such as from a roll 265 or directly from a previous station) can be fed into a slitting/cutting process 320 to cut the laminate into sections of a desired size. In cases where the laminate is too thick to roll onto a roll 265, it may be fed directly from a prior process forming the laminate 260.

The resulting sections 310 can then be used to create a finished product. For example, the sections 310 may be slats that can be used in venetian blinds, or sections for use in a fence or door, or longer sections to form drop down barriers like blinds, for example.

Further note that although the layers described hereinabove are mostly comprised of woven or unwoven sheets of fabrics using fibers, individual layers of the laminates might instead, or additionally, utilize thin sheets of solid material that can also be flexible, such as foils or solid, thin films of plastics or anti-ballistic materials, or even stiff materials. Some materials, such as Kevlar, might benefit by using an abrasion process on the surface(s) prior to performing adhesive or other bonding processes.

In a preferred embodiment, any of the above described laminates can be used to produce products that have antiballistic properties, and which might be certified to various standards of bullet-resistance and protection from shrapnel distributed by a bomb, for example. These laminates, comprised of any combination of the anti-ballistic materials described above can provide protection from bullets fired from handguns, rifles, shotguns, or other weapons. They can also provide protection against knife thrusts, or shrapnel resulting from explosions such as bombs or other weapons or explosive devices.

These laminates can be utilized in barriers of various designs to protect enclosed or external spaces, such as by use in fencing, blinds, mobile barriers, or other types of deployable barriers that can protect a space or region or people from ballistic objects. Furthermore, these barriers can be used in walls or doors to provide protection from penetration by ballistic objects, or even vehicles and/or persons or other objects that may threaten a space or people.

For example, the rolled sheets of finished laminate can be cut to desired lengths and/or widths to form sheets for rolling for use in blinds or other deployable barriers. Or sheets of laminates can be cut and used to create thicker and stiffer materials to form slats that might be used in fencing or venetian style blinds. Sheets of laminates can be used with doors or as part of the structure of doors for use in garages or other buildings to protect against vehicle entry.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method of producing a continuous length of flexible ballistic resistant laminate comprising the steps of:

feeding a continuous length of a first sheet of material including a ballistic resistant material into a bonding process;

feeding a continuous length of a second sheet of material into the bonding process;

feeding a continuous length of a third sheet of material into the bonding process; and using said bonding process to bond said first sheet of material, said second sheet of material, and said third sheet of material together to form said continuous length of flexible ballistic resistant laminate, wherein said bonding process includes the step of stitch bonding the first sheet of material, the second sheet of material, and the third sheet of material together to form said continuous length of flexible ballistic resistant laminate that is sufficiently flexible to be rolled into a roll; and wherein said flexible ballistic resistant laminate is configured to prevent a ballistic object including a bullet and/or explosive shrapnel from penetrating the flexible ballistic resistant laminate.

2. The method of claim 1, wherein said second sheet of material includes said ballistic resistant material or another ballistic resistant material.

3. The method of claim 1, wherein said second sheet of material includes another ballistic resistant material different than said ballistic resistant material, and wherein the second sheet of material is placed adjacent to said first sheet of material.

4. The method of claim 3, wherein said ballistic resistant material includes Kevlar or another poly-para-phenylene terephthalamide, and wherein said other ballistic resistant material included in said second sheet of material includes Dyneema or another ultra-high molecular weight polyethylene.

5. The method of claim 1, further comprising feeding continuous lengths of a plurality of additional sheets of material into the bonding process to form said flexible ballistic resistant laminate.

6. The method of claim 5, wherein each one of said additional sheets of material include said ballistic resistant material.

7. The method of claim 1, further comprising feeding a continuous length of a sheet of material that does not provide anti-ballistic properties into the bonding process to form an outer surface on said flexible ballistic resistant laminate.

8. The method of claim 1, wherein at least one of said first sheet, said second sheet, and/or said third sheet has fire resistant properties.

9. The method of claim 1, wherein said ballistic resistant material includes Kevlar or another poly-para-phenylene terephthalamide.

10. The method of claim 1, wherein said ballistic resistant material includes Dyneema or another ultra-high molecular weight polyethylene.

11. The method of claim 1, further comprising the step of applying a substance on at least one of said first, second, and/or third layers.

12. The method of claim 11, wherein said substance includes an adhesive, and wherein said applying step is performed prior to said bonding process.

13. The method of claim 11, wherein said substance is applied to an outer layer of said laminate.

14. The method of claim 11, wherein said substance includes a fire resistant material.

15. The method of claim 1, wherein said first sheet of material is a woven fabric including ballistic resistant material threads, yarns, or fibers.

16. The method of claim 15, wherein at least one of said second and/or said third sheet of material includes an unwoven mat including some type of ballistic resistant material fibers.

17. The method of claim 1, further comprising the step of feeding at least one additional sheet of material comprising an unwoven mat including said ballistic resistant material or another ballistic resistant material as fibers.

18. The method of claim 1, wherein said step of stitch bonding includes the step of stitch bonding additional sheets of material together to form said flexible ballistic resistant laminate.

19. The method of claim 1, wherein said bonding process includes the step of stitch bonding the first sheet of material, the second sheet of material, and the third sheet of material together using a regular pattern of transverse stitches spaced equally apart along a longitudinal length of said sheet of flexible ballistic resistant laminate.

20. The method of claim 1, further comprising the step of adhesive bonding at least one additional sheet of material to said flexible ballistic resistant laminate.

21. The method of claim 1, further comprising the step of using heat to bond at least one additional sheet of material to said flexible ballistic resistant laminate.

22. A method of producing a continuous length of flexible ballistic resistant laminate comprising the steps of:

feeding a continuous length of a first sheet of material including a ballistic resistant material into a bonding process;

feeding a continuous length of a second sheet including said ballistic resistant material or another ballistic resistant material into the bonding process;

feeding a continuous length of a third sheet including said ballistic resistant material into the bonding process;

using said bonding process to bond said first sheet of material, said second sheet of material, and said third sheet of material together to form said continuous length of flexible ballistic resistant laminate; and providing an outer layer on a surface of the continuous length of flexible ballistic resistant laminate that is configured to be exposed in a product incorporating the laminate, wherein said flexible ballistic resistant laminate is configured for use in said product to prevent a ballistic object including a bullet and/or explosive shrapnel from penetrating the flexible ballistic resistant laminate.

23. The method of claim 22, wherein said bonding process includes the step of stitch bonding the first sheet of material, the second sheet of material, and the third sheet of material together in a regular pattern of transverse stitches spaced equally apart along a longitudinal length of said sheet of flexible ballistic resistant laminate.

24. The method of claim 22, wherein said bonding process includes the step of adhesive bonding at least one of the first sheet of material, the second sheet of material, and/or the third sheet of material to another one of the first sheet of material, the second sheet of material, and/or the third sheet of material.

25. The method of claim 22, further comprising the step of providing a plurality of additional layers of material in said flexible ballistic resistant laminate, each one of said additional layers including some type of ballistic resistant material(s).

26. A method of producing a continuous length of flexible ballistic resistant laminate comprising the steps of:
- feeding a continuous length of a first sheet of material including a ballistic resistant material woven into a cloth into a bonding process;
- feeding a continuous length of a second sheet including said ballistic resistant material or another ballistic resistant material into the bonding process;
- feeding a continuous length of an outer layer that does not provide anti-ballistic properties into the bonding process; and
- using said bonding process utilizing stitching in a regular pattern of transverse stitches spaced equally apart along a longitudinal length of said sheet of flexible ballistic resistant laminate to bond said first sheet of material, said second sheet of material, said third sheet of material together to form said continuous length of flexible ballistic resistant laminate, wherein
- the outer decorative layer is provided on an outer surface of the continuous length of flexible ballistic resistant laminate, and wherein
- said flexible ballistic resistant laminate is configured to prevent a ballistic object including a bullet fired from a gun from penetrating the flexible ballistic resistant laminate.

27. The method of claim 26, further comprising the step of providing a plurality of additional layers of material in said flexible ballistic resistant laminate, each one of said additional layers including some type of ballistic resistant material(s).

28. A method of producing a continuous length of flexible ballistic resistant laminate comprising the steps of:
- feeding a continuous length of a first sheet of material including a ballistic resistant material into a bonding process;
- feeding a continuous length of one or more additional sheets of material into the bonding process;
- using said bonding process to stitch bond said first sheet of material and said one or more additional sheets of material together to form said continuous length of flexible ballistic resistant laminate, wherein
- said laminate is sufficiently flexible to be rolled into a roll; and wherein
- said laminate is configured to prevent a ballistic object including a bullet and/or explosive shrapnel from penetrating said laminate.

29. The method of claim 28, wherein said stitch bonding includes providing stitches in the continuous length of flexible ballistic resistant laminate in a regular pattern of transverse stitches spaced apart along a longitudinal length of said sheet of flexible ballistic resistant laminate.

30. A method of producing a continuous length of flexible ballistic resistant laminate comprising the steps of:
- feeding a continuous length of a first sheet of material including a ballistic resistant material into a stitch bonding process;
- feeding a continuous length of one or more additional sheets of material into the bonding process;
- using said bonding process to stitch bond said first sheet of material and said one or more additional sheets of material together to form said continuous length of flexible ballistic resistant laminate, wherein said stitch bonding includes providing stitches in the continuous length of flexible ballistic resistant laminate in a regular pattern of transverse stitches spaced apart along a longitudinal length of said sheet of flexible ballistic resistant laminate; and
- providing an outer layer on at least a portion of said continuous length of ballistic resistant laminate for use to produce a product with the outer layer being in view of an observer using the product, wherein
- said continuous length of ballistic resistant laminate is sufficiently flexible to be rolled into a roll; and wherein
- said continuous length of ballistic resistant laminate is configured to prevent a ballistic object including a bullet and/or explosive shrapnel from penetrating the product.

31. The method of claim 30, wherein said decorative layer is also secured to said sheet of flexible ballistic resistant laminate by said stitch bonding step.

32. The method of claim 28, further comprising the step of cutting said continuous length of flexible ballistic resistant laminate into lengths of a desired dimension for use in said product.

* * * * *